US011792654B2

(12) United States Patent
Jiang et al.

(10) Patent No.: US 11,792,654 B2
(45) Date of Patent: Oct. 17, 2023

(54) METHOD AND APPARATUS FOR PERFORMING TRANSMISSION

(71) Applicant: NEC CORPORATION, Tokyo (JP)

(72) Inventors: Lei Jiang, Beijing (CN); Hongmei Liu, Beijing (CN); Chuangxin Jiang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 526 days.

(21) Appl. No.: 16/480,494

(22) PCT Filed: Jul. 31, 2015

(86) PCT No.: PCT/CN2015/085791
§ 371 (c)(1),
(2) Date: Jul. 24, 2019

(87) PCT Pub. No.: WO2017/020198
PCT Pub. Date: Feb. 9, 2017

(65) Prior Publication Data
US 2020/0228991 A1    Jul. 16, 2020

(51) Int. Cl.
*H04W 16/14* (2009.01)
*H04W 72/0446* (2023.01)
(Continued)

(52) U.S. Cl.
CPC ....... *H04W 16/14* (2013.01); *H04W 72/0446* (2013.01); *H04W 72/23* (2023.01); *H04W 74/0808* (2013.01)

(58) Field of Classification Search
CPC ............... H04W 16/14; H04W 72/042; H04W 72/0446; H04W 74/0808; H04W 74/02
See application file for complete search history.

(56) References Cited

U.S. PATENT DOCUMENTS

| 2014/0003387 A1* | 1/2014 | Lee | H04L 5/0096 370/330 |
| 2014/0112289 A1* | 4/2014 | Kim | H04L 5/0078 370/329 |

(Continued)

FOREIGN PATENT DOCUMENTS

| CN | 104363657 A | 2/2015 |
| CN | 104469914 A | 3/2015 |

(Continued)

OTHER PUBLICATIONS

Communication dated Dec. 10, 2019, from the Canadian Intellectual Property Office in application No. 3,032,209.

(Continued)

*Primary Examiner* — Chae S Lee
(74) *Attorney, Agent, or Firm* — Sughrue Mion, PLLC (57) ABSTRACT

A method for performing transmission between a base station and a terminal device according to a frame structure over an unlicensed spectrum in a wireless network that supports communications over a licensed spectrum and the unlicensed spectrum. The frame structure includes a first set of time resources and at least a first number of consecutive downlink subframes. The method includes determining, during the first set of time resources, availability of an unlicensed carrier in the unlicensed spectrum and reserving a subset in the first set of time resources on the unlicensed carrier upon the unlicensed carrier being determined to be available. The method also includes performing downlink transmission from the base station to the terminal device at least partially within the first number of consecutive downlink subframes on at least the unlicensed carrier in response to a duration of the reserved subset of time resources expiring.

15 Claims, 10 Drawing Sheets

(51) Int. Cl.
  *H04W 74/08* (2009.01)
  *H04W 72/23* (2023.01)

(56) References Cited

U.S. PATENT DOCUMENTS

| | | | | |
|---|---|---|---|---|
| 2016/0029331 A1* | 1/2016 | Seo | ............... | H04L 27/2613 370/350 |
| 2016/0050667 A1* | 2/2016 | Papasakellariou | .... | H04L 5/0053 370/329 |
| 2016/0183204 A1* | 6/2016 | Seo | ............... | H04L 27/2646 455/127.2 |
| 2017/0085346 A1* | 3/2017 | Tiirola | ............ | H04W 56/0045 |

FOREIGN PATENT DOCUMENTS

| | | | |
|---|---|---|---|
| CN | 104486013 | A | 4/2015 |
| CN | 104486792 | A | 4/2015 |
| CN | 104579518 | A | 4/2015 |
| CN | 104717686 | A | 6/2015 |
| WO | 2015/042594 | A2 | 3/2015 |
| WO | 2015/105702 | A1 | 7/2015 |

OTHER PUBLICATIONS

Written Opinion for PCT/CN2015/085791, dated Apr. 28, 2016.
International Search Report for PCT/CN2015/085791, dated Apr. 28, 2016.
Communication dated Nov. 5, 2020, from the Canadian Intellectual Property Office in application No. 3,032,209.

* cited by examiner

METHOD AND APPARATUS FOR PERFORMING TRANSMISSION

CROSS REFERENCE TO RELATED APPLICATIONS

This application is a National Stage of International Application No. PCT/CN2015/085791 filed Jul. 31, 2015.

TECHNICAL FIELD

The non-limiting and exemplary embodiments of the present disclosure generally relate to wireless communications, and specifically to a method and an apparatus for performing transmission according to a frame structure over an unlicensed spectrum in a wireless network that supports communications over both a licensed spectrum and the unlicensed spectrum.

BACKGROUND

This section introduces aspects that may facilitate better understanding of the present disclosure. Accordingly, the statements of this section are to be read in this light and are not to be understood as admissions about what is in the prior art or what is not in the prior art.

The fast uptake of the Third Generation Partnership Project (3GPP)-Long Term Evolution (LTE) in different regions of the world shows the increasing demand for wireless broadband data. In order to meet the ever increasing data traffic demand from users, particularly in concentrated high traffic buildings or hot spots, more mobile broadband bandwidth will be needed. Given a large amount of spectrum available in unlicensed bands around the globe, the unlicensed spectrum is more and more considered by cellular operators as complementary means to augment their service offering. While the unlicensed spectrum may not match the qualities of the licensed regime, solutions that allow an efficient use of it as a complement to licensed deployments have a potential to bring a great value to mobile operators, and ultimately to the mobile industry as a whole. This type of solutions would enable operators and vendors to leverage the existing or planned investments in LTE/Evolved Package Core (EPC) hardware in radio and core networks.

Figure 1:
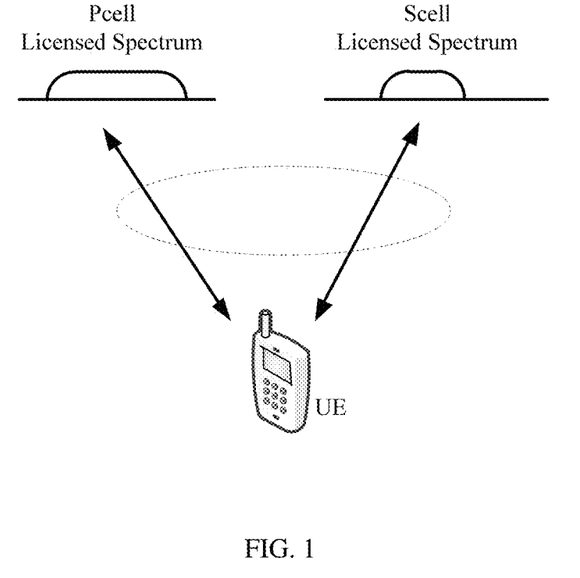
FIG. 1 shows an illustrative network that configures a UE to aggregate a secondary cell which is using an unlicensed carrier in an unlicensed spectrum.

It has been agreed to study Licensed-Assisted Access (LAA) technologies in the 3GPP at RP-141664. This LAA framework builds on carrier aggregation solutions introduced in LTE Release-10 to access additional bandwidth in the unlicensed spectrum and thus supports coexistence of different radio technologies, such as LTE and Wi-Fi. FIG. 1 shows an illustrative network that configures a user equipment, UE, to aggregate a secondary cell (SCell) which is using an unlicensed carrier in the unlicensed spectrum. The primary cell (PCell) may maintain exchange of essential control messages and offer real-time and high-value traffic over the licensed spectrum. Via the robust licensed spectrum, the PCell may also provide mobility handling and management for the UE. The aggregated SCells in the unlicensed spectrum, when available, can be utilized as a bandwidth booster to serve the best effort traffic. The LAA SCells may operate in downlink (DL) or uplink (UL) or both.

However, due to the uncertainty of resource availability on unlicensed carriers, direct application of the existing frame structure in LTE systems to LAA systems may cause some problems, e.g. unexpected resource waste or transmission delay etc.

Therefore, there is a need for an efficient and flexible solution to the frame structure applicable to wireless networks that support communications over licensed and unlicensed spectrums, e.g. LAA networks.

SUMMARY

Various embodiments of the present disclosure mainly aim at providing an efficient and flexible solution to the frame structure applicable to wireless networks that support communications over licensed and unlicensed spectrums. Other features and advantages of embodiments of the present disclosure will also be understood from the following description of specific embodiments when read in conjunction with the accompanying drawings, which illustrate the principles of embodiments of the present disclosure.

In a first aspect of the present disclosure, there is provided a method for performing transmission between a base station and a terminal device according to a frame structure over an unlicensed spectrum in a wireless network that supports communications over both an licensed spectrum and the unlicensed spectrum. The frame structure comprises a first set of time resources and at least a first number of consecutive downlink subframes. The method comprises determining, during the first set of time resources and at the base station, availability of an unlicensed carrier in the unlicensed spectrum and reserving a subset in the first set of time resources on the unlicensed carrier upon the unlicensed carrier is determined to be available. The method also comprises performing downlink transmission from the base station to the terminal device at least partially within the first number of consecutive downlink subframes on at least the unlicensed carrier in response that a duration of the reserved subset of time resources expires.

In an embodiment, the frame structure may further comprise a second number of consecutive uplink subframes and a subframe comprising a first guard period. Downlink transmission is performed before the first guard period and no transmission is performed during the first guard period. In this embodiment, the method may further comprise receiving uplink transmission from the terminal device upon the first guard period expires.

In a second aspect of the present disclosure, there is provided a method for performing transmission between a base station and a terminal device according to a frame structure over an unlicensed spectrum in a wireless network that supports communications over both an licensed spectrum and the unlicensed spectrum. The frame structure comprises a first set of time resources and at least a number of consecutive uplink subframes. The method comprises receiving, at the terminal device, an uplink grant on a licensed carrier in the licensed spectrum and determining, during the first set of time resources, availability of an unlicensed carrier in the unlicensed spectrum. The method also comprises reserving a subset in the first set of time resources on the unlicensed carrier upon the unlicensed carrier is determined to be available and performing uplink transmission from the terminal device to the base station at least partially within the consecutive uplink subframes on the unlicensed carrier in response that a duration of the reserved subset of time resources expires.

In a third aspect of the present disclosure, there is provided an apparatus for performing transmission between a base station and a terminal device according to a frame structure over an unlicensed spectrum in a wireless network that supports communications over both a licensed spectrum and the unlicensed spectrum. The frame structure comprises a first set of time resources and at least a first number of consecutive downlink subframes. The apparatus comprises a determining unit, a reserving unit and a transmission performing unit. The determining unit is configured to determine, during the first set of time resources, availability of an unlicensed carrier in the unlicensed spectrum. The reserving unit is configured to reserve a subset in the first set of time resources on the unlicensed carrier upon the unlicensed carrier is determined to be available. The transmission performing unit is configured to perform downlink transmission from the base station to the terminal device at least partially within the first number of consecutive downlink subframes on at least the unlicensed carrier in response that a duration of the reserved subset of time resources expires.

In a fourth aspect of the present disclosure, there is provided an apparatus for performing transmission between a base station and a terminal device according to a frame structure over an unlicensed spectrum in a wireless network that supports communications over both a licensed spectrum and the unlicensed spectrum. The frame structure comprises a first set of time resources and at least a number of consecutive uplink subframes. The apparatus comprises a receiving unit, a determining unit, a reserving unit and a transmission performing unit. The receiving unit is configured to receive an uplink grant on a licensed carrier in the licensed spectrum. The determining unit is configured to determine, during the first set of time resources, availability of an unlicensed carrier in the unlicensed spectrum. The reserving unit is configured to reserve a subset in the first set of time resources on the unlicensed carrier upon the unlicensed carrier is determined to be available. The transmission performing unit is configured to perform uplink transmission from the terminal device to the base station at least partially within the consecutive uplink subframes on the unlicensed carrier in response that a duration of the reserved subset of time resources expires.

In a fifth aspect of the present disclosure, there is provided an apparatus for performing transmission between a base station and a terminal device according to a frame structure over an unlicensed spectrum in a wireless network that supports communications over both a licensed spectrum and the unlicensed spectrum. The apparatus may be implemented at the base station and comprises a processor and a memory, the memory containing instructions executable by the processor, whereby the apparatus is operative to perform the method according to the first aspect of the present disclosure. Alternatively, the apparatus may be implemented at the terminal device and comprises a processor and a memory, the memory containing instructions executable by the processor, whereby the apparatus is operative to perform the method according to the second aspect of the present disclosure.

BRIEF DESCRIPTION OF THE DRAWINGS

The above and other aspects, features, and benefits of various embodiments of the present disclosure will become more fully apparent from the following detailed description with reference to the accompanying drawings, in which.

Like reference numbers and designations in the various drawings indicate like elements.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," "a further embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "base station" (BS), used herein may also be referred to as e.g. eNB, eNodeB, NodeB or base transceiver station (BTS), Access Node (AN) or Access Point (AP) etc. depending on the technology and terminology used. Likewise, the term "terminal device" or UE used herein may refer to any terminal having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like. In this document, the terms "terminal device" and "UE" will be used interchangeably.

Embodiments of the present disclosure will be applicable to any wireless network that supports communications over both a licensed spectrum and an unlicensed spectrum, including but not limited to an LAA network.

For better and easier understanding of the present disclosure, some general concepts will be introduced first, which however will not constitute a limitation to the present disclosure.

Due to the sharing property of the unlicensed spectrum, there is a possibility that a same transmission resource will be used simultaneously by multiple stations, including a base station and a terminal device, and thus a collision may occur. In order to avoid such a collision, in the existing wireless networks operating in the unlicensed spectrum, e.g. a Wireless Local Area Network (WLAN) using Wi-Fi technology, a Carrier Sense Multiple Access (CSMA) scheme, which is also referred to as "listen before talk" (LBT), is used to mediate the access to a transmission resource. All stations, including a base station and a terminal device, are allowed to access the resource but are required to make sure the resource is not in use by other stations before transmitting.

Figure 2:
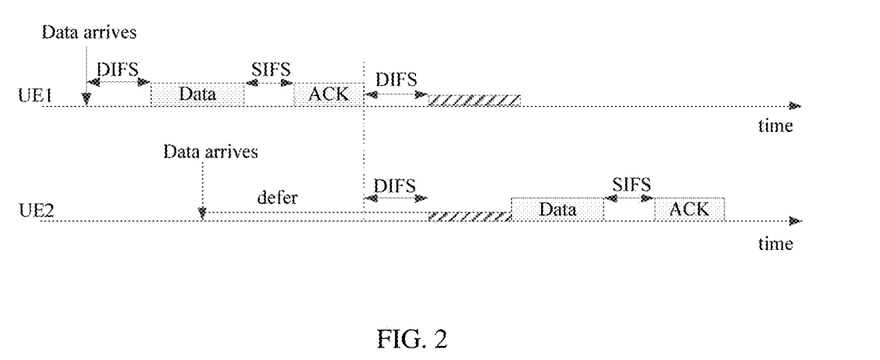
FIG. 2 schematically explains an operation of the existing LBT scheme used in current Wi-Fi systems.

FIG. 2 schematically explains an access operation used in current Wi-Fi systems. As illustrated, a station, e.g. a UE that wishes to transmit a packet first senses the medium. If the medium is sensed idle for a certain time (the so-called Distributed Inter Frame Space (DIFS), e.g. 34 μs for 802.11a), the packet is then transmitted. If the medium is sensed busy, the station, e.g. UE2, defers until the medium is sensed idle. When this occurs, the station does not transmit immediately, since it may lead to collisions if more than one station was deferring. Instead, the station sets a backoff timer to a random value, and does not transmit until this timer has expired. The backoff timer is only decreased when the medium is sensed idle. Whenever the medium is sensed busy, a deferment state is entered where the backoff timer is not decreased. When the backoff timer expires, the packet will be transmitted. If the packet is successfully received by a receiving station, it responds with an acknowledgement to the transmitting station. The acknowledgement is sent a Short Inter Frame Space (SIFS), e.g. 16 μs for 802.11a, after the packet is received.

Hereafter, various embodiments of the present disclosure will be described with reference to FIGS. 3-11.

Figure 3:
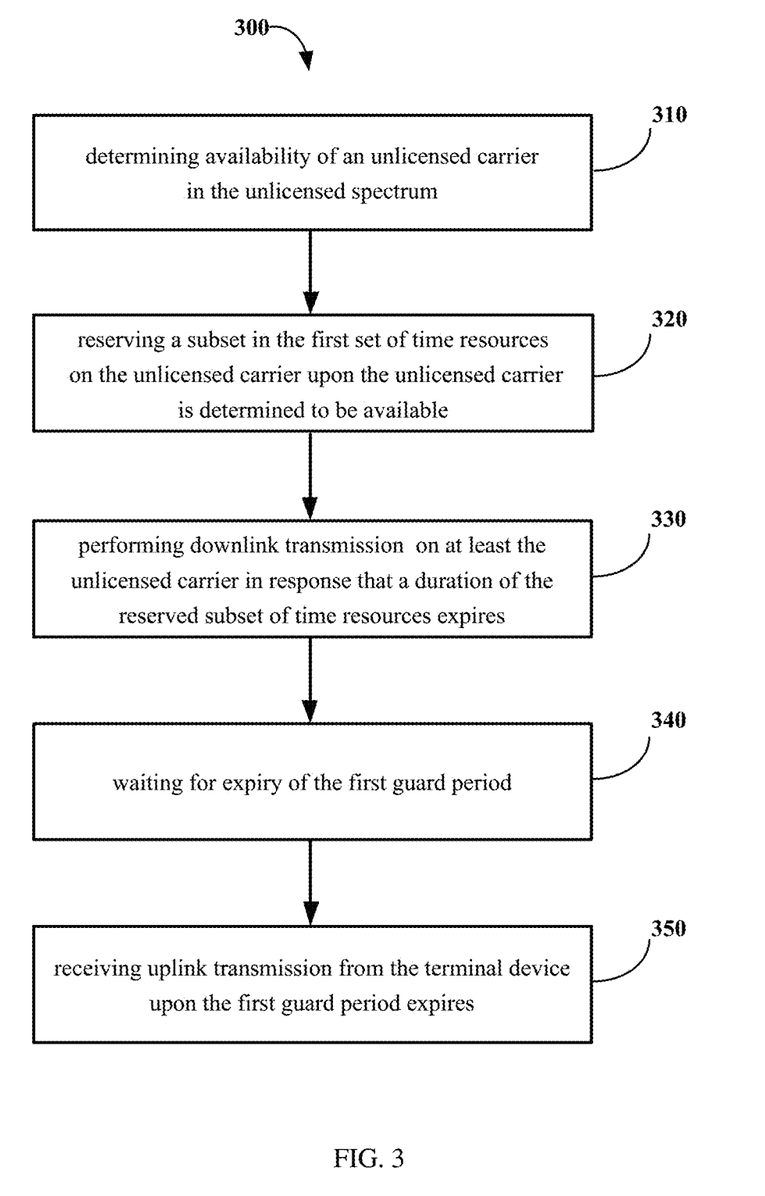
FIG. 3 illustrates a flowchart of a method for performing transmission according to a frame structure over an unlicensed spectrum in accordance with some embodiments of the present disclosure.

FIG. 3 illustrates a flowchart of a method 300 for performing transmission between a base station and a terminal device according to a frame structure over an unlicensed spectrum in a wireless network in accordance with some embodiments of the present disclosure. The wireless network supports communications over both a licensed spectrum and the unlicensed spectrum, which means the base station and the terminal device are operable in both the licensed spectrum and the unlicensed spectrum. The frame structure comprises a first set of time resources and at least a first number of consecutive DL subframes, in which DL transmission may be performed. The DL transmission may comprise transmission of DL control information (which will be simplified as DL control transmission hereafter) and DL data transmission. The method 300 is performed at the base station.

As illustrated, method 300 starts at step 310, in which availability of an unlicensed carrier in the unlicensed spectrum is determined at the base station during the first set of time resources. For example, the base station may determine the availability of the unlicensed carrier by making a clear channel assessment (CCA) check, e.g. using the LBT scheme.

Then at step 320, a subset in the first set of time resources is reserved on the unlicensed carrier upon the unlicensed carrier is determined to be available. For example, the subset of time resources may be reserved by transmitting a signal, which may be referred to as a reservation signal, on the unlicensed carrier to the terminal device for a duration of the reserved subset of time resources.

In an embodiment, the reserved subset of time resources may last till an end of the first set of time resources, for example when it is predefined that the DL transmission shall be started at a boundary of a DL subframe.

In another embodiment, the reserved subset of time resources may last till a start of a certain symbol comprised in the first set of time resources, for example when it is predefined that the DL transmission shall be started at certain symbols.

At step 330, downlink transmission from the base station to the terminal device is performed at least partially within the first number of consecutive downlink subframes on at least the unlicensed carrier in response that the duration of the reserved subset of time resources expires.

In an embodiment, a part of the downlink transmission may be performed within the first set of time resources upon the duration of the reserved subset of time resources expires, for example when the reserved subset of time resources lasts till the start of the certain symbol comprised in the first set of time resources.

FIGS. 4(A)-4(D) illustrate four exemplary frame structures used in method 300 according to different embodiments of the present disclosure, in which a plurality of subframes used on a licensed carrier in the licensed spectrum is shown at the top as a timing reference, each subframe having a predefined duration Ls.

Figures 4A, 4B, 4C:
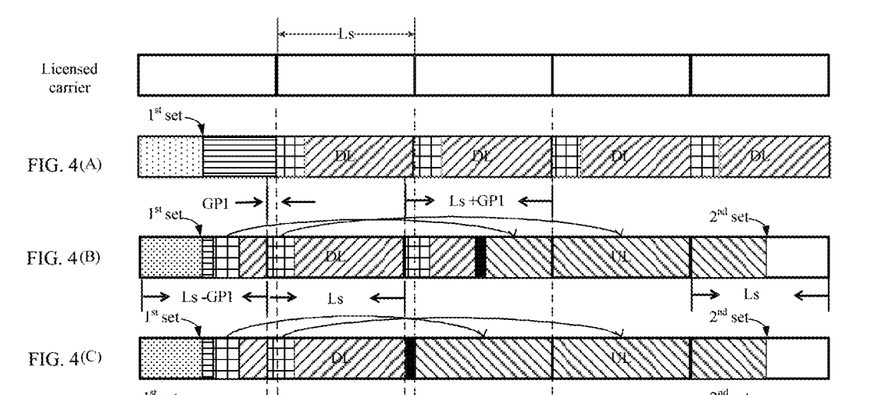
FIGS. 4(A)-4(D) illustrate four exemplary frame structures according to some embodiments of the present disclosure.
Figure 4D:
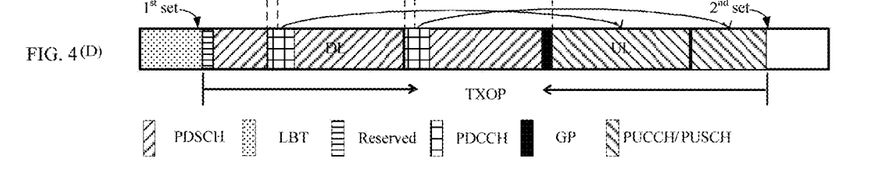

The frame structure as illustrated in FIG. 4(A) comprises the first set of time resources and four DL subframes only; each of the frame structures as illustrated in FIG. 4(B)-(D) comprises the first set of time resources and one DL subframe. Preferably, the number of DL subframes comprised in the frame structure may be varied according to an amount of data waiting at the base station for transmission.

In the embodiment of FIG. 4(A), according to the illustrated exemplary frame structure, the determination of the availability of the unlicensed carrier is first performed during the first set of time resources by using the LBT scheme, as shown with a dotted block. Then a subset of the first set of time resources is reserved till the end of the first set of time resources, as shown with a horizontally shaded block. Upon the duration of the reserved subset of times resource expires, DL transmission, including DL control transmission and DL data transmission, is performed in the four consecutive DL subframes. In FIG. 4(A), the DL control transmission, particularly PDCCH (Physical Downlink Control Channel) is shown with squared blocks and the DL data transmission, particularly PDSCH (Physical Downlink Shared Channel) is shown with left diagonally shaded blocks.

In an embodiment, the frame structure may further comprise a second number of consecutive UL subframes and a subframe comprising a first guard period (GP1). DL transmission is always performed before the first guard period GP1 and no transmission is performed during GP1, regardless of a position of the subframe comprising GP1. In most cases, the subframe comprising GP1 is located after a DL subframe and before an UL subframe. In this embodiment, the method 300 may further comprise a step 340 of waiting for expiry of the first guard period GP1 and then receiving uplink transmission from the terminal device upon the first guard period expires at step 350.

In order to guarantee enough time for transition from transmission to reception and ensure the unlicensed carrier is not taken by other users, e.g. in Wi-Fi networks, the duration of the first guard period may be comparable with DIFS and follow the formula of:

$$TTP+2d \leq D_{GP1},$$

wherein $D_{GP1}$ denotes the duration of the first guard period; TTP denotes a transmitter transient period of the terminal device; and d denotes a propagation delay from the base station to a farthermost terminal device in a cell served by the base station. Preferably, the duration of the first guard period may follow the formula of $TTP+2d \leq D_{GP1} \leq DIFS$.

In various embodiments, the first guard period may be located at a start or an end of the subframe comprising it, or between the start and the end of the subframe comprising it.

In the embodiment of FIG. 4(B), the frame structure further comprises a UL subframe and a subframe comprising the first guard period GP1 as shown with a black block. According to the illustrated exemplary frame structure, the determination of availability of the unlicensed carrier is first performed by using the LBT scheme, as shown with a dotted block in FIG. 4(B). In this embodiment, it is predefined that the DL transmission may be started at a certain symbol. Then as illustrated, a subset of the first set of time resources is reserved till a start of the certain symbol in the first set of time resources, as shown with a horizontally shaded block. Upon the duration of the reserved subset of times resource expires, DL transmission, including DL control transmission and DL data transmission, is performed. In FIG. 4(B), the DL control transmission, particularly PDCCH shown with a squared block and a part of the DL data transmission, particularly PDSCH shown with left diagonally shaded blocks are performed within the first set of time resources upon the duration of the reserved subset of times resource expires. Then, the DL transmission keeps being performed within the following DL subframe until the first guard period GP1 is encountered. During the first guard period GP1, no transmission is performed. Then uplink transmission, including UL control information transmission and/or UL data transmission, is received from the terminal device upon the first guard period GP1 expires. In FIG. 4(B), the UL transmission, particularly including PUCCH (Physical Uplink Control Channel) and PUSCH (Physical Uplink Shared Channel) is shown with right diagonally shaded blocks.

In this embodiment of FIG. 4(B), the first guard period GP1 is inserted between two symbols in the subframe comprising GP1. Therefore, both DL transmission and UL transmission are performed within this subframe. Moreover, the duration of this subframe comprising GP1 is longer than a DL subframe or an UL subframe by the duration of GP1. The DL subframe and UL subframe have the same duration Ls as the subfame on the licensed carrier. In order to keep alignment with scheduling timing on the licensed carrier, the duration of the first set of time resources is shorter than DL or UL subframe, e.g. by the duration of GP1 in this embodiment.

The embodiment of FIG. 4(C) differs from the above embodiment of FIG. 4(B) only in that the first guard period GP1 is located at the start of the subframe comprising GP1. Therefore, in this embodiment, only UL transmission is performed within this subframe after GP1. Moreover, the duration of this subframe comprising GP1 is also longer than a DL subframe or an UL subframe by the duration of GP1.

The embodiment of FIG. 4(D) shows that the first guard period GP1 is located at the end of the subframe comprising GP1. Therefore, in this embodiment, only DL transmission is performed within this subframe before GP1. Moreover, the duration of this subframe comprising the first guard period GP1 is also longer than a DL subframe or an UL subframe by the duration of GP1. In order to keep alignment with scheduling timing on the licensed carrier, the duration of the first set of time resources is shorter than the DL or UL subframe, e.g. by the duration of GP1 in this embodiment.

It shall be appreciated that the frame structures in FIGS. 4(A)-4(D) are shown for the purpose of illustration only rather than limiting. Specifically, positions and numbers of the UL and DL subframes may be dynamically changed according to requirements in actual applications.

FIGS. 5(A)-5(C) show three exemplary frame structures used in method 300 according to some other embodiments of the present disclosure. Each of the illustrated three exemplary frame structures comprises a first set of time resources, one DL subframe and a subframe comprising a guard period GP and one UL subframe. The operations or features that are the same as those according to the embodiments in FIGS. 4(A)-4(D) will be omitted herein for the sake of brevity. Only differences between them will be described.

As shown in FIGS. 5(A)-5(C), all subframes in each frame structure and the first set of time resources have the same duration as the subframes used on the licensed carrier. Thus, timing of the illustrated exemplary frame structure is exactly aligned with the timing of a frame structure used on the licensed carrier.

The difference among the three illustrated frame structures in FIGS. 5(A)-5(C) lies only in the position of the guard period GP in the subframe comprising it.

In the embodiment of FIG. 5(A), the GP is located between the start and the end of the subframe comprising it, particularly at a start or an end of a certain symbol comprised in that subframe. Thus, both DL transmission and UL transmission are performed within this subframe.

In the embodiment of FIG. 5(B), the GP is located at the start of the subframe comprising it. Thus, only UL transmission is performed within this subframe. In the embodiment of FIG. 5(C), the GP is located at the end of the subframe comprising it. Thus, only DL transmission is performed within this subframe.

Figure 5:
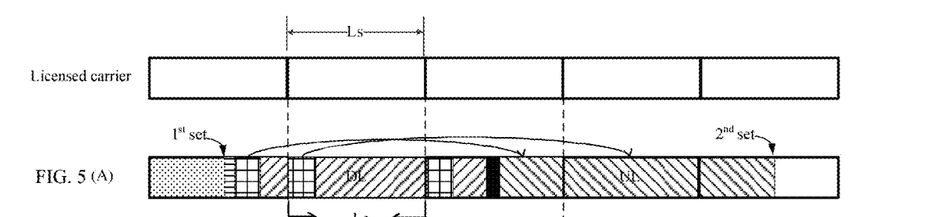
FIGS. 5(A)-5(C) illustrate three exemplary frame structures according to some other embodiments of the present disclosure.

Further, in the frame structures as shown in FIG. 4 (B)-(D) and FIG. 5 (A)-(C), the curved arrows illustrate a relationship between the DL control transmission and UL scheduling. Although all the UL scheduling as shown are from the DL control transmission on the unlicensed carrier, DL control transmission may alternatively performed on the licensed carrier for the UL scheduling. For example, in the case that there is not enough DL subframes for transmitting DL control information on the unlicensed carrier for UL scheduling, the DL control transmission may be performed on the licensed carrier. Assuming the duration Ls of a subframe is 1 ms, then a time difference between the subframe where the UL grant is transmitted and the subframe where UL transmission is performed may be less than or equal to 4 ms Additionally, in the case that the transmit opportunity (TXOP) (which refers to a period during which no CCA checking needs to be made for transmission) is long enough, the transition from UL transmission to DL transmission may be involved. Thus, in some embodiments according to the present disclosure, the frame structure may further comprise a subframe comprising a second guard period GP2. Differently from the first guard period GP1, UL transmission is always performed before the second guard period GP2, while DL transmission is always performed after the second guard period GP2 and again, no transmission is performed during the second guard period GP2, regardless of the position of the subframe comprising GP2. In most cases, the subframe comprising GP2 is located after an UL subframe and before a DL subframe.

Figure 6:
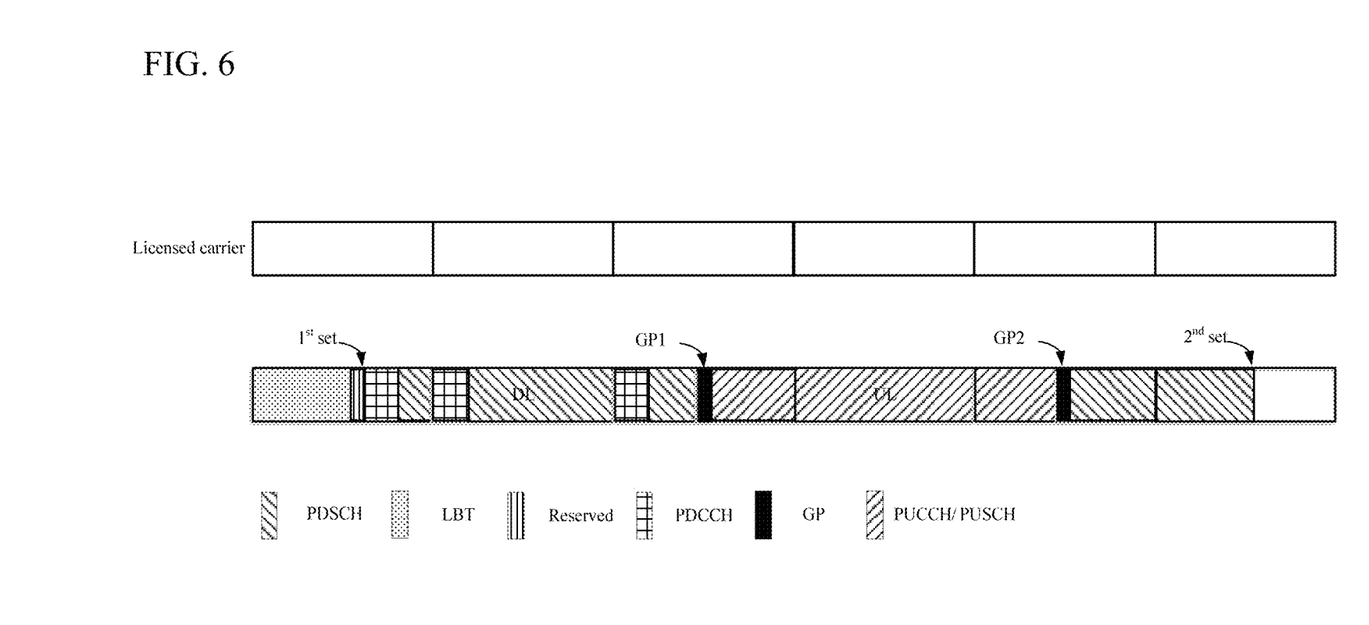
FIG. 6 illustrates another exemplary frame structure according to an embodiment of the present disclosure.

FIG. 6 shows another exemplary frame structure used in method 300 according to an embodiment of the present disclosure. The main difference between the frame structures in FIG. 6 and FIG. 4(B) lies in that the frame structure in FIG. 6 further comprises a second guard period, GP2. Although FIG. 6 only shows the case that GP2 is located between the start and the end of the subframe comprising it and all subframes have the same duration, it shall be appreciated that GP2 may also be located at the start or the end of the subframe comprising it and additionally, the subframe comprising GP2 may be longer than a DL subframe or an UL subframe by the duration of GP2. Accordingly, the first set of time resources may be even shorter than a DL subframe or an UL subframe, e.g. by a sum of the durations of GP1 and GP2.

Similarly to the first guard period GP1 as discussed above, in order to guarantee enough time for transition from reception to transmission and ensure that the unlicensed carrier is not taken by other users during the transition, the duration of the second guard period GP2 may be comparable with DIFS and follow the formula of TTP≤$D_{GP2}$, wherein $D_{GP2}$ denotes the duration of the second guard period and TTP denotes a transmitter transient period of the terminal device. Preferably, the duration of the second guard period may follow the formula of TTP≤$D_{GP2}$≤DIFS.

According to another embodiment, the frame structure used in method 300 may further comprise a second set of time resources. Only a subset of the second set of time resources may be used for transmission. Particularly, if the transmission previous to the subset of time resources is DL transmission, then that subset is used for the DL transmission, as shown in FIG. 6. Otherwise, if the transmission previous to the subset of time resources is UL transmission, then that subset is used for the UL transmission, as shown in FIG. 4(B)-(D) and FIG. 5(A)-(C).

It shall be appreciated that the numbers of DL or UL subframes and the subframes comprising GP1 or GP2 in FIGS. 4-6 are shown for the purpose of illustration only rather than limiting. Those skilled in the art shall understand that these numbers may be dynamically changed according to requirements in actual applications.

In the method 300, the base station makes the CCA check for the terminal device, so that the hidden node problem in UL can be avoided and different sensing timing of terminal devices can also avoided. Thereby, cross-link interference among different operators/radio access technologies can be mitigated and more terminal devices can transmit data simultaneously according to scheduling information from the base station.

Figure 7:
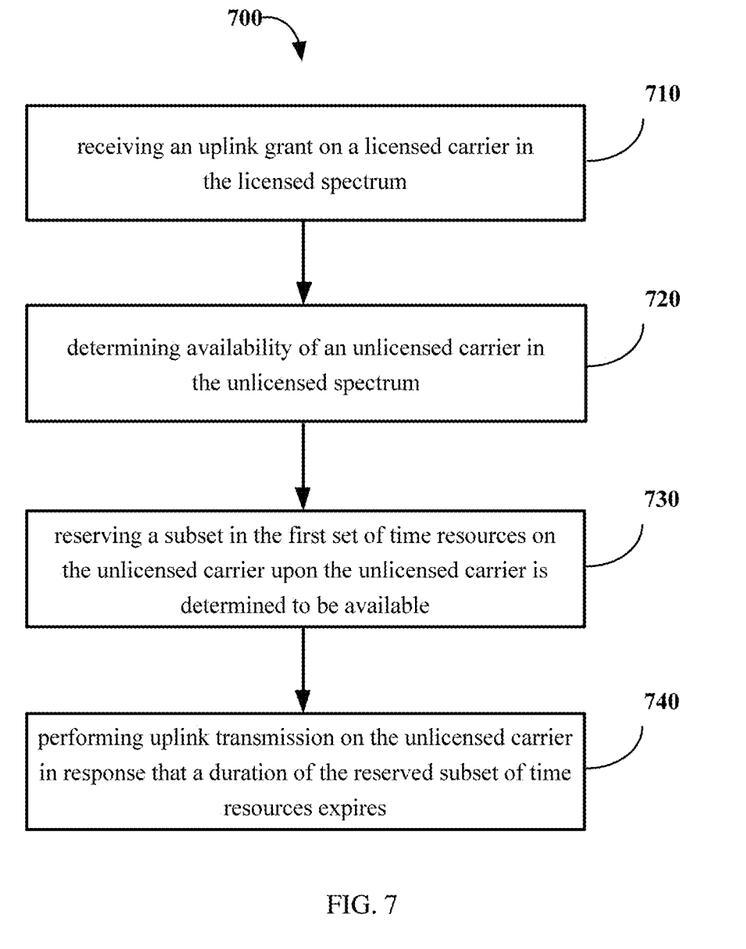
FIG. 7 illustrates a flowchart of a method for performing transmission according to a frame structure over an unlicensed spectrum in accordance with some other embodiments of the present disclosure.

FIG. 7 illustrates a flowchart of a method 700 for performing transmission between a base station and a terminal device according to a frame structure over an unlicensed spectrum in a wireless network in accordance with embodiments of the present disclosure. The wireless network supports communications over both a licensed spectrum and the unlicensed spectrum, which means the base station and the terminal device are operable in both the licensed spectrum and the unlicensed spectrum. The frame structure comprises a first set of time resources and at least a first number of consecutive UL subframes, in which UL transmission may be performed. Preferably, the number of UL subframes comprised in the frame structure may be varied according to an amount of data waiting at the terminal device for transmission. The method 700 is performed at the terminal device.

As illustrated, the method 700 starts at step 710, in which an uplink grant is received on a licensed carrier in the licensed spectrum.

At step 720, availability of an unlicensed carrier in the unlicensed spectrum is determined at the terminal device during the first set of time resources. For example, the terminal device may determine the availability of the unlicensed carrier by making a CCA check, e.g. using the LBT scheme.

Then at step 730, a subset in the first set of time resources is reserved on the unlicensed carrier upon the unlicensed carrier is determined to be available. For example, the subset of time resources may be reserved by transmitting a reservation signal to the base station for the duration of the reserved subset.

In an embodiment, the reserved subset of time resources may last till an end of the first set of time resources, for example when it is predefined that the UL transmission shall be started at the boundary of an UL subframe.

In another embodiment, the reserved subset of time resources may last till a start of a certain symbol comprised in the first set of time resources, for example when it is predefined that the UL transmission shall be started at certain symbols.

At step 740, uplink transmission from the terminal device to the base station is performed at least partially within the consecutive uplink subframes on the unlicensed carrier in response that a duration of the reserved subset of time resources expires.

In an embodiment, a part of the UL transmission may be performed within the first set of time resources upon the duration of the reserved subset of time resources expires, for example when the reserved subset of time resources lasts till the start of the certain symbol comprised in the set of time resources.

FIGS. 8(A)-8(B) illustrate two exemplary frame structures used in the method 700 according to embodiments of the present disclosure. As illustrated, timing of the frame structure over the unlicensed spectrum is aligned with the timing of a frame structure over the licensed spectrum.

In the embodiment of FIG. 8(A), according to the illustrated exemplary frame structure, an UL grant is received from the base station on a licensed carrier, as shown with the curved arrow. The determination of the availability of the unlicensed carrier is performed during the first set of time resources by using the LBT scheme, as shown with a dotted block. Then a subset of the first set of time resources is reserved till the start of a certain symbol in the first set of time resources, as shown with a horizontally shaded block. Upon the duration of the reserved subset of times resource expires, UL transmission, including UL control information transmission and UL data transmission, is performed. In this embodiment, the UL transmission starts in the first set of time resources after the reserved subset.

In the embodiment of FIG. 8(B), the reserved subset of time resources shown with a horizontally shaded block lasts till the end of the first set of time resources. Therefore, no UL transmission is performed within the first set of time resources. In this embodiment, the UL transmission is started at the subframe that is one subframe later than the subframe in which the UL grant is successfully received on the licensed carrier.

In an alternative embodiment, after the uplink grant is successfully received, the earliest time to perform the UL transmission may be at the start of a symbol immediately after the unlicensed carrier is available. Assuming the duration Ls of a subframe is 1 ms, then a time difference between the subframe where the UL grant is transmitted and the subframe where UL transmission is performed may be less than or equal to 4 ms.

In another embodiment of the method 700, the frame structure may further comprise a second set of time resources. Only a subset of the second set of time resources may be used for UL transmission. In the exemplary frame structures of FIGS. 8(A) and (B), the first half of the second set of time resources is used for the UL transmission, as shown with right diagonally shaded blocks.

Figure 9:
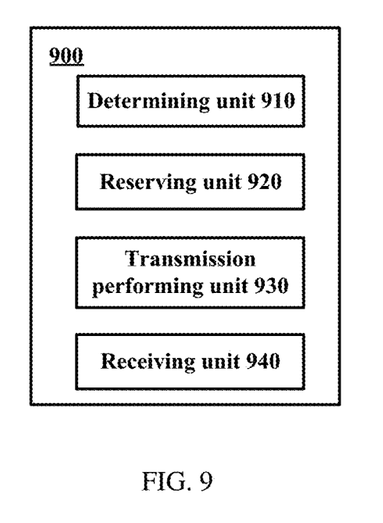
FIG. 9 illustrates a schematic block diagram of an apparatus for performing transmission according to a frame structure over an unlicensed spectrum in accordance with some embodiments of the present disclosure.

FIG. 9 illustrates a schematic block diagram of an apparatus 900 for performing transmission between a base station and a terminal device according to a frame structure over an unlicensed spectrum in a wireless network in accordance with embodiments of the present disclosure. The wireless network supports communications over both a licensed spectrum and the unlicensed spectrum, which means the base station and the terminal device are operable in both the licensed spectrum and the unlicensed spectrum. The frame structure comprises a first set of time resources and at least a first number of consecutive DL subframes, in which DL transmission is performed. The DL transmission may comprise transmission of DL control information and DL data transmission. The apparatus 900 may be embodied at or as at least a part of the base station.

Particularly, the apparatus 900 comprises a determining unit 910, a reserving unit 920 and a transmission performing unit 930.

The determining unit 910 is configured to determine, during the first set of time resources, availability of an unlicensed carrier in the unlicensed spectrum. The reserving unit 920 is configured to reserve a subset in the first set of time resources on the unlicensed carrier upon the unlicensed carrier is determined to be available. The transmission performing unit 930 is configured to perform downlink transmission from the base station to the terminal device at least partially within the first number of consecutive downlink subframes on at least the unlicensed carrier in response that a duration of the reserved subset of time resources expires.

In an embodiment, a part of the downlink transmission may be performed within the first set of time resources upon the duration of the reserved subset of time resources expires.

In another embodiment, the frame structure may further comprise a second number of consecutive uplink subframes and a subframe comprising a first guard period. No matter where the subframe comprising the first guard period is located, downlink transmission is always performed before the first guard period and no transmission is performed during the first guard period. In this embodiment, the apparatus 900 may further comprise a receiving unit 940 configured to receive uplink transmission from the terminal device upon the first guard period expires.

In a further embodiment, the frame structure may further comprise a second set of time resources. A subset of the second set of time resources may be used for downlink transmission if transmission previous to the subset of time resources is the downlink transmission. Alternatively, the subset of the second set of time resources may be used for uplink transmission if the transmission previous to the subset of time resources is the uplink transmission.

The above units 910-930 may be configured to implement the corresponding operations or steps as described with reference to FIGS. 3-6. All features of the frame structure described above in relation to method 300 and with reference to FIGS. 3-6 are equally applicable to the apparatus 900 and thus will not be detailed herein for the sake of brevity.

Figure 10:
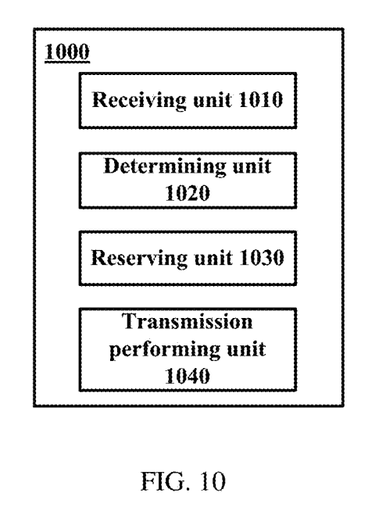
FIG. 10 illustrates a schematic block diagram of an apparatus for performing transmission according to a frame structure over an unlicensed spectrum in accordance with some other embodiments of the present disclosure.

FIG. 10 illustrates a schematic block diagram of an apparatus 1000 for performing transmission between a base station and a terminal device according to a frame structure over an unlicensed spectrum in a wireless network in accordance with embodiments of the present disclosure. The wireless network supports communications over both a licensed spectrum and the unlicensed spectrum, which means the base station and the terminal device are operable in both the licensed spectrum and the unlicensed spectrum. The frame structure comprises a first set of time resources and at least a first number of consecutive UL subframes, in which UL transmission is performed. The apparatus 1000 may be embodied at or as at least a part of the terminal device.

Particularly, the apparatus 1000 comprises a receiving unit 1010, a determining unit 1020, a reserving unit 1030 and a transmission performing unit 1040.

The receiving unit 1010 is configured to receive an uplink grant on a licensed carrier in the licensed spectrum. The determining unit 1020 is configured to determine, during the first set of time resources, availability of an unlicensed carrier in the unlicensed spectrum. The reserving unit 1030 is configured to reserve a subset in the first set of time resources on the unlicensed carrier upon the unlicensed carrier is determined to be available. The transmission performing unit 1040 is configured to perform uplink transmission from the terminal device to the base station at least partially within the consecutive uplink subframes on the unlicensed carrier in response that a duration of the reserved subset of time resources expires.

In an embodiment, the frame structure may further comprise a second set of time resources. The subset of the second set of time resources may be used for the uplink transmission.

Figure 8:
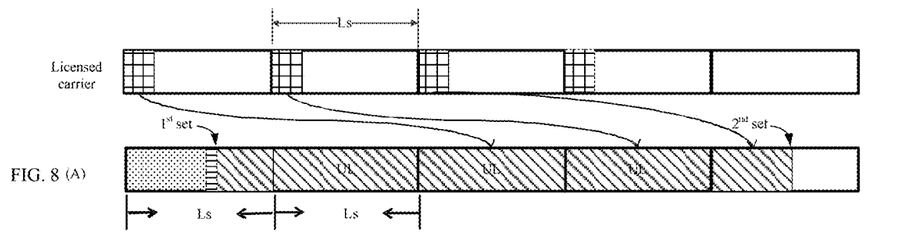
FIGS. 8(A)-8(B) illustrate two exemplary frame structures according to some embodiments of the present disclosure.

The above units 1010-1040 may be configured to implement the corresponding operations or steps as described with reference to FIGS. 7 and 8. All features of the frame structure described above in relation to method 700 and with reference to FIGS. 7 and 8 are equally applicable to the apparatus 1000 and thus will not be detailed herein for the sake of brevity.

Figure 11:
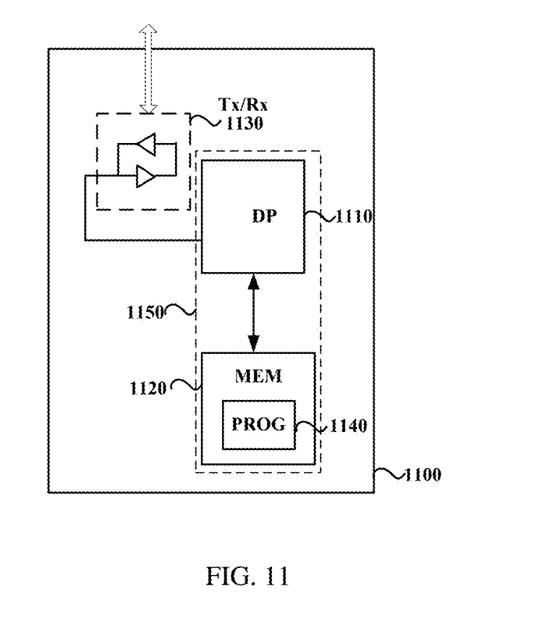
FIG. 11 illustrates a schematic block diagram of another apparatus for performing transmission according to a frame structure over an unlicensed spectrum in accordance with embodiments of the present disclosure.

FIG. 11 illustrates a schematic block diagram of an apparatus 1100 for performing transmission between a base station and a terminal device according to a frame structure over an unlicensed spectrum in a wireless network in accordance with embodiments of the present disclosure. The wireless network supports communications over both a licensed spectrum and the unlicensed spectrum, which means the base station and the terminal device are operable in both the licensed spectrum and the unlicensed spectrum.

The apparatus 1100 comprises at least one processor 1110, such as a data processor (DP) and at least one memory (MEM) 1120 coupled to the processor 1110. The apparatus 1100 may further comprise a transmitter TX and receiver RX 1130 coupled to the processor 1110 for establishing wireless communications with other apparatuses. The MEM 1120 stores a program (PROG) 1140. A combination of the at least one processor 1110 and the at least one MEM 1120 may form processing means 1150 adapted to implement some embodiments of the present disclosure.

The apparatus 1100 may be embodied at or as at least a part of the base station. In this case, the PROG 1140 may include instructions that, when executed on the associated processor 1110, enable the apparatus 1100 to operate in accordance with the embodiments of the present disclosure, for example to perform the method 300 as described with reference to FIGS. 3-6. Alternatively, the processing means 1150 may be adapted to implement some embodiments of the present disclosure as described with reference to FIGS. 3-6.

The apparatus 1100 may also be embodied at or as at least a part of the terminal device. In this case, the PROG 1140 may include instructions that, when executed on the associated processor 1110, enable the apparatus 1100 to operate in accordance with the embodiments of the present disclosure, for example to perform the method 700 as described with reference to FIGS. 7 and 8. Alternatively, the processing means 1150 may be adapted to implement some embodiments of the present disclosure as described with reference to FIGS. 7 and 8.

The MEM 1120 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1110 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a User Equipment (UE), the method comprising:
   receiving downlink control information from a base station;
   transmitting to the base station, on an unlicensed spectrum, a Physical Uplink Shared Channel (PUSCH), associated with the downlink control information, from a first position in subframe n on the unlicensed spectrum,
      wherein an interval between the first position and a starting position of the subframe n is shorter than a duration of a symbol of the subframe n; and
   receiving a downlink transmission in subframe m+1,
   wherein the downlink transmission is not received during a time period within subframe m, and
   wherein the time period is shorter than a duration of a symbol at an end of the subframe m.

2. The method of claim 1, wherein no transmission of the PUSCH is performed during the interval.

3. The method of claim 1, wherein the downlink transmission is received from a start of the subframe m+1.

4. The method of claim 1, further comprising performing an uplink transmission in the subframe m.

5. A method performed by a base station, the method comprising:
   transmitting downlink control information to a User Equipment (UE);
   receiving from the UE, on an unlicensed spectrum, a Physical Uplink Shared Channel (PUSCH), associated with the downlink control information, from a first position in subframe n on the unlicensed spectrum,
      wherein an interval between the first position and a starting position of the subframe n is shorter than a duration of a symbol of the subframe n; and
   performing a downlink transmission in subframe m+1,
   wherein the downlink transmission is not performed during a time period within subframe m, and
   wherein the time period is shorter than a duration of a symbol at an end of the subframe m.

6. The method of claim 5, wherein no transmission of the PUSCH is received during the interval.

7. The method of claim 5, wherein the downlink transmission is transmitted from start of the subframe m+1.

8. The method of claim 5, further comprising, receiving an uplink transmission in the subframe m.

9. A User Equipment (UE) comprising a transceiver configured to:
   receive downlink control information from a base station; and
   transmit to the base station, on an unlicensed spectrum, a Physical Uplink Shared Channel (PUSCH), associated with the downlink control information, from a first position in subframe n on the unlicensed spectrum,
      wherein an interval between the first position and a starting position of the subframe n is shorter than a duration of a symbol of the subframe n; and
   receive a downlink transmission in subframe m+1,
   wherein the downlink transmission is not received during a time period within subframe m, and
   wherein the time period is shorter than a duration of a symbol at an end of the subframe m.

10. The UE of claim 9, wherein no transmission of the PUSCH is performed during the interval.

11. The UE of claim 9, wherein the downlink transmission is received from start of the subframe m+1.

12. The UE of claim 9, wherein the transceiver is further configured to perform an uplink transmission in the subframe m.

13. The method of 1, wherein the first position is located immediately after the interval after the starting position of subframe n.

14. The method of 5, wherein the first position is located immediately after the interval after the starting position of subframe n.

15. The UE of claim 9, wherein the first position is located immediately after the interval after the starting position of subframe n.

* * * * *